United States Patent 3,701,816
Patented Oct. 31, 1972

3,701,816
PHOSPHORUS-CONTAINING POLYMERS AND A PROCESS FOR THE PREPARATION THEREOF
Sumitaka Nogami, Asaka, Masaki Ishigami, Nobeoka, and Jiro Kurita, Yokohama, Japan, assignors to Asahi Kasei Kogyo Kabushiki Kaisha, Kita-ku, Osaka, Osaka Prefecture, Japan
No Drawing. Filed Nov. 14, 1968, Ser. No. 775,953
Claims priority, application Japan, Nov. 16, 1967, 42/73,380
Int. Cl. C07f 9/32, 9/40
U.S. Cl. 260—927         10 Claims

ABSTRACT OF THE DISCLOSURE

Polyphosphonates, useful as a plastic material, as a plasticizer and as an additive, represented by the general formula

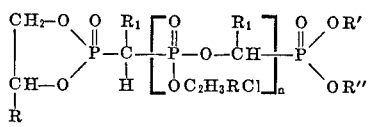

wherein $n$ represents an integer of 1 or more; R represents a hydrogen atom, an alkyl group having 1 to 4 carbon atoms or a haloalkyl group having 1 to 4 carbon atoms; $R_1$ represents a hydrogen atom, an alkyl group having 1 to 6 carbon atoms, a phenyl group, an alkenyl group or a cyclohexyl group; and R′ and R″ which may be the same or different and may form a phosphoran ring, each represent an alkyl group having 1 to 6 carbon atoms, a haloalkyl group having 1 to 6 carbon atoms or an aryl group and a process for the preparation of the same which comprises reacting a cyclic chlorophosphite with an aldehyde in the presence of an organic phosphite.

---

The present invention relates to novel phosphorus-containing polymers and a process for the preparation thereof. More particularly this invention relates to novel polyphosphonates which are obtained by using a cyclic chlorophosphite, an aldehyde and an organic phosphite, and a process for the preparation thereof.

The polyphosphonates of this invention have not only excellent heat-, acid- and alkali-resistances but also good compatibility with various plastic materials, mineral oils and the like. Therefore they are very useful not only as a plastic material itself but also as a plasticizer for various materials, additive for cup grease or hydraulic oils and the like. In addition, the plastics of the present polyphosphonate are also excellent in mechanical properties such as tensile strength and elongation.

As a result of the intensive study by the inventors, it has now been found that such novel useful polyphosphonates can simply be produced by reacting a cyclic chlorophosphite with an aldehyde in the presence of an organic phosphite.

The polyphosphonates according to the present invention are represented by the general formula

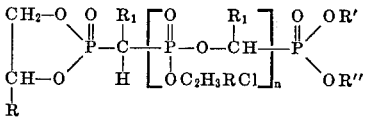

wherein $n$ represents an integer of 1 or more; R represents a hydrogen atom, an alkyl group having 1 to 4 carbon atoms or a haloalkyl group having 1 to 4 carbon atoms; $R_1$ represents a hydrogen atom, an alkyl group having 1 to 6 carbon atoms, a phenyl group, an alkenyl group or a cyclohexyl group; and R′ and R″ which may be the same or different and may form a phosphoran ring each represent an alkyl group having 1 to 6 carbon atoms, a haloalkyl group having 1 to 6 carbon atoms or an aryl group.

Cyclic chlorophosphites which are employed in the process of the present invention are represented by the general formula

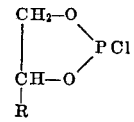

wherein R represents a hydrogen atom, an alkyl group having 1 to 4 carbon atoms or a haloalkyl group having 1 to 4 carbon atoms.

Representative examples of cyclic chlorophosphites are (1,2 - ethylene)chlorophosphite, (2-methyl-1,2-ethylene) chlorophosphite, (2-chloromethyl - 1,2 - ethylene)chlorophosphite, (2-bromomethyl-1,2-ethylene)chlorophosphite and (2-ethyl-1,2-ethylene)chlorophosphite.

Suitable aldehydes which are employed in the process of the present invention are represented by the general formula

wherein $R_1$ represents an hydrogen atom, an alkyl group containing 1 to 6 carbon atoms, a phenyl group, an alkenyl group or a cyclohexyl group. Representative examples of aldehydes are formaldehyde, acetaldehyde, benzaldehyde and allyl aldehyde. Besides, those compounds, capable of functioning substantially as an aldehyde, for example paraldehyde including paraformaldehyde and trioxymethylene, are equally useful.

Organic phosphites which may be employed in the process of the present invention are represented by the general formula

wherein R′, R″ and R‴ which may be the same or different and any pair of which may form a phosphoran ring represent each an alkyl group having 1 to 6 carbon atoms, a haloalkyl group having 1 to 6 carbon atoms or an aryl group. Besides, derivatives of such organic phosphites may be employed. Of the above formula-identified compounds, however, those which are non-reactive in the so-called Arbusow reaction, such as triphenyl phosphite and tris(2,2,2-trichloroethyl)phosphite cannot be employed as the organic phosphite in the process according to the present invention. Consequently, it is to be noted that the organic phosphites employable in the process of this invention are those which are not only of the above formula but also reactive in the Arbusow reaction. Representative examples of the organic phosphite are tris(2-chloroethyl)phosphite,
tris(1,2-dichloroethyl)phosphite,
tris(ethyl)phosphite,
diphenyl-2-chloroethyl phosphite,
(1,2-ethylene)2′-chloroethyl phosphite and
(2-chloromethyl-1,2-ethylene)-2′-chloroethyl phosphite.

It is furthermore to be noted that, since the useful organic phosphite having the above formula is synthesized by the reaction of the cyclic chlorophosphite to be employed as material of the present process with an epoxy compound such as ethylene oxide, propylene oxide, epichlorohydrine or the like, such epoxy compound may be employed instead of said organic phosphite in practising the process of the present invention.

One and principal feature of the process of the present invention resides in that a cyclic chlorophosphite is reacted with an aldehyde in the presence of an organic phosphite to produce the desired polyphosphonate.

Another feature of the process of the present invention resides in that, by changing the ratio of an organic phosphite to a cyclic chlorophosphite in the reaction system, the polymerization degree of the resulting polyphosphonate can easily be controlled as one chooses in accordance with the purpose of use of the product.

The aldehyde is suitably employed in an amount of 0.8 to 1.2 moles, preferably 1.0 to 1.1 moles, per mole of cyclic chlorophosphite. While, the organic phosphite is preferably employed in an amount of less than equivalent moles per mole of cyclic chlorophosphite.

By heating the product obtained by the reaction of the cyclic chlorophosphite with the aldehyde, the polymerization reaction is caused to progress. In this case, the organic phosphite present in the reaction system functions as a stopper of the polymerization reaction. Theoretically, therefore, the number of moles of the organic phosphite employed is in agreement with that of the resulting polyphosphonate, leading to the conclusion that the polymerization degree of the polyphosphonate will be determined exactly depending on the number of moles of the organic phosphite employed.

Furthermore, it is noted that the organic phosphite is useful not only for controlling the polymerization degree of the polyphosphonate but for improving the thermal stability of the resulting polyphosphonate.

The cyclic chlorophosphite which is employed in the process of the invention can be produced in exceedingly high yield by reacting the corresponding diol with phosphorus trichloride under the appropriate condition.

In carrying out the process according to the present invention, the aldehyde is added to a mixture of the cyclic chlorophosphite with the organic phosphite, and the reaction is effected at a temperature of 15° to 160° C. The polyphosphonate thus formed is unstable because of trivalent phosphorus present in the molecule in a small amount. Such unstable polyphosphonate is converted to the stable one by heating the former at a temperature of 160° to 250° C. under nitrogen stream for short period of time. This is attributable to the fact that by the heat-treatment at a temperaure of 160° to 250° C. the trivalent phosphorus is oxidized to pentavalent phosphorus, resulting in the stable form of compound. Consequently, according to the present invention, the reaction is effected in two stages; namely, a polymer formation stage conducted at a temperature of 15° to 160° C. and a polymer stabilization stage conducted at a temperature of 160° to 250° C. In the course of the polymer stabilization stage the organic phosphite may further be added in an amount of 2 to 10% by weight based on the total amount of raw material, whereby the thermal stability of the final product is improved to a further degree.

The reaction in the first or polymer formation stage according to the present invention is an exothermic reaction. As a result of this, the temperature of the reaction system occasionally tends to rise to a higher degree than the required. In such case, the elevation of the temperature may be depressed by a suitable cooling medium. Otherwise, the reaction temperature may be controlled by conducting the reaction under reflux of a suitable inert solvent, for example, an aromatic compound such as benzene, toluene, xylene or the like, or a chlorinated aliphatic compound such as dichloroethane or tetrachloroethane.

While the process of this invention may be carried out in the absence of a catalyst with a sufficient good result, the reaction is effected in the presence of a catalyst with more advantage. The use of a minor amount of an organic or inorganic acidic substance accelerates the rate of reaction. The presence of water is also especially useful for the acceleration of the reaction rate. Such amount of water is sufficient as contained as moisture content in air or in the aldehyde employed as material. It is, therefore, unnecessary to positively add water.

The polyphosphonates thus synthesized have excellent water-, alkali- and heat-resisting properties. The product does not experience any deterioration even at heating at a temperature of 230° C. in air.

As mentioned hereinbefore, the polymerization degree of the polyphosphonates produced according to the present invention is varied depending on the amount of the organic phosphite employed in the process. The polyphosphonate having a polymerization degree up to 100 is useful as the additive while that having a polymerization degree of 1000 or more is used as plastics.

The following examples are illustrative of the process and the products of the present invention, but are not to be construed as limiting the scope thereof.

EXAMPLE 1

To a mixture of 17.5 g. of (2-chloromethyl-1,2-ethylene)chlorophosphite with 21.9 g. of (2-chloromethyl-1,2-ethylene) 2'-chloroethyl phosphite were added 3.16 g. paraformaldehyde containing 5% by weight of moisture at room temperature (hereinafter, in case that paraformaldehyde is employed, it is to be understood that the paraformaldehyde has a moisture content of 5% by weight). The resulting mixture was immersed in a bath of a temperature of 140° C., and the heating was continued for 20 minutes, so that the content of the bath became transparent. Into another bath of a temperature of 80° C. was transferred the above-mentioned content, whereupon the reaction was allowed to continue for 5 hours. Subsequently, the resultant was heated at 160° C. under nitrogen stream for 1 hour to obtain a viscous transparent liquid product.

As a result of the elementary analysis as well as the N.M.R. analysis, the liquid product thus obtained was identified as a compound having the formula

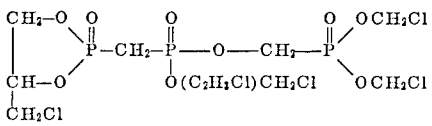

The reduced viscosity of the product was measured in a 0.5% by weight chloroform solution at a temperature of 25° C. and estimated as 0.01.

EXAMPLE 2

The same process as described in Example 1 was repeated with exception that 52.5 g. of (2-chloromethyl-1,2-ethylene)chlorophosphite, 21.9 g. of (2-chloromethyl-1,2-ethylene) 2'-chloroethyl phosphite and 9.45 g. of paraformaldehyde were employed as materials.

As a result of the elementary analysis as well as the N.M.R. analysis and the molecular weight measurement by the cryoscopic method employing a benzene solution, the product was identified as a compound having the formula

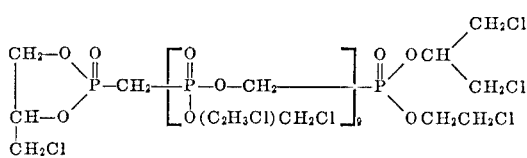

The reduced viscosity of the polyphosphonate thus obtained was measured under the same condition as described in Example 1, and estimated as 0.01.

Next, 20 parts of the phosphorus-containing polymer thus produced were dissolved in 100 parts of methyl methacrylate. To the resulting solution were added 0.01 part of azobisisobutyronitrile, and then the polymerization was effected at a temperature of 60° C. The polymethyl methacrylate thus yielded was completely colorless transparent and exhibited good self-fire-extinguishing property.

The polymethyl methacrylate was immersed in a 5% by weight caustic soda solution or a 5% by weight sulfuric acid solution for a whole day and night, without undergoing any deterioration.

EXAMPLE 3

To 175 g. of (2-chloromethyl-1,2-ethylene)chlorophosphite was with cooling added gradually 17.4 g. of propylene oxide, and subsequently was added 22 g. of paraformaldehyde. The resulting mixture was heated to react at a temperature of 140° C. for 30 minutes. The reaction was further continued in such a manner as heating at a temperature of 80° C. for 4 hours and subsequently heating under nitrogen stream at a temperature of 170° C. for 2 hours, resulting in a colorless transparent product having a high viscosity.

As a result of the elementary analysis as well as the N.M.R. analysis and the molecular weight measurement, the product thus obtained was identified as a compound having the formula

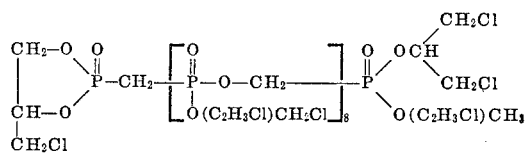

The reduced viscosity of the polyphosphonate was measured under the same condition as described in Example 1 and was estimated as 0.1. The properties examined in the same manner as described in Example 2 were the same as in Example 2.

EXAMPLE 4

To 140 g. of (2-methyl-1,2-ethylene)chlorophosphite was at a temperature of 80° C. added 18.5 g. of epichlorohydrin, and subsequently was with cooling added 26 g. of paraformaldehyde. The resulting mixture was heated to react at a temperature of 140° C. for 30 minutes. The reaction was allowed to further proceed under nitrogen stream at a temperature of 160° C. for 1 hour, resulting in a light yellow viscous product.

As a result of the elementary analysis as well as the N.M.R. analysis and the molecular weight measurement, the product thus obtained was identified as a compound having the formula

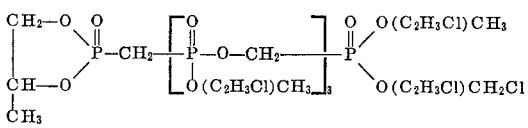

The reduced viscosity of the polyphosphonate thus obtained was measured under the same condition as described in Example 1 and estimated as 0.02.

Next, 20 parts of the polyphosphonate were added to an ethyl acetate 50% by weight solution containing 30 parts of nitrocellulose having a falling-ball viscosity of ½ sec., whereupon the resultant was applied onto a kraft paper having a thickness of 50μ, followed by the drying to form the coating film with a thickness of 1.5 to 5μ. The film exhibited a good flexibility even at a temperature of −40° C., while the coating film formed without addition of the polyphosphonate showed cracks under the same condition.

EXAMPLE 5

To 140 g. of (2-methyl-1,2-ethylene)chlorophosphite was at a temperautre of 80° C. added 9.25 g. of epichlorohydrin, and subsequently was added 95.4 g. of benzaldehyde while maintaining the temperature at 30° C. After the mixture was allowed to stand at a temperature of 30° C. for 1 hour, it was heated under nitrogen stream at a temperature of 170° C. for 1 hour to react, resulting in a slightly light yellow viscous product.

As a result of the elementary analysis as well as the N.M.R. and the molecular weight measurement, the product was identified as a compound having the formula

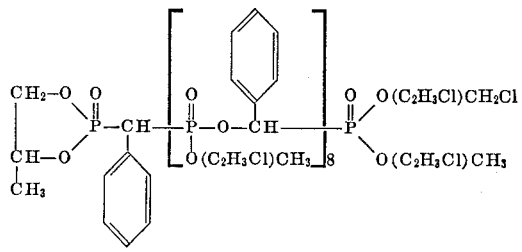

EXAMPLE 6

By employing 177.8 parts of (2-chloromethyl-1,2-ethylene)chlorophosphite, 44 parts of acetaldehyde and 0.44 part of ethylene oxide, the reaction was effected in the same manner as described in Example 3.

The reduced viscosity of the polyphosphonate thus produced was measured under the same condition as described in Example 1 and estimated as 0.5. The product was a colorless solid having a softening point of 110 to 150° C.

EXAMPLE 7

The same process as described in Example 5 was repeated with exception that epichlorohydrine was employed in an amount of 0.0925 g. instead of 9.25 g., and the reaction was effected under the dried nitrogen atmosphere. The reduced viscosity of the polyphosphonate thus produced was measured under the same condition as described in Example 1 and estimated as 1.5. The product was a hard transparent solid resin having a softening point of 180° to 220° C.

What is claimed is:

1. A polyphosphonate of the formula

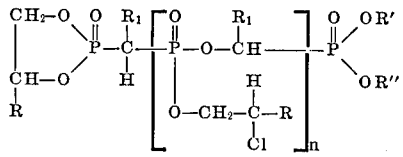

wherein $n$ is an integer of 1 to about 1000; R is hydrogen, alkyl having 1 to 4 carbon atoms or chloro- or bromoalkyl having 1 to 4 carbon atoms; $R_1$ is hydrogen, alkyl having 1 to 6 carbon atoms, phenyl, allyl or cyclohexyl and R' and R'', which may be the same or different and which taken together may complete a ring with the phosphorus atom, each is alkyl having 1 to 6 carbon atoms, haloalkyl having 1 to 6 carbon atoms or phenyl.

2. A polyphosphonate as claimed in claim 1, wherein R is chloromethyl, $R_1$ is hydrogen, and R' and R'' are each chloromethyl.

3. A polyphosphonate as claimed in claim 1, wherein R is chloromethyl, $R_1$ is hydrogen, R' is di(chloromethyl) methyl and R'' is chloroethyl.

4. A polyphosphonate as claimed in claim 1, wherein R is chloromethyl, $R_1$ is hydrogen, R' is di(chloromethyl)methyl and R'' is methylchloroethyl.

5. A polyphosphonate as claimed in claim 1, wherein R is methyl, $R_1$ is hydrogen, R' is methylchloroethyl and R'' is chloromethylchloroethyl.

6. A polyphosphonate as claimed in claim 1, wherein R is methyl, $R_1$ is phenyl, R' is chloromethylchloroethyl and R'' is methylchloroethyl.

7. A process for the preparation of polyphosphonates of the formula

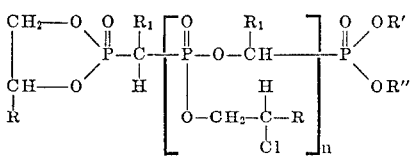

wherein $n$ is an integer of 1 to about 1000; R is hydrogen, alkyl having 1 to 4 carbon atoms or chloro- or bromo-alkyl having 1 to 4 carbon atoms; $R_1$ is hydrogen, alkyl having 1 to 6 carbon atoms, phenyl, alkenyl or cyclohexyl; and R' and R", which may be the same or different and which taken together may complete a ring with the phosphorus atom, each is alkyl having 1 to 6 carbon atoms, haloalkyl having 1 to 6 carbon atoms or aryl, which comprises reacting a cyclic chlorophosphite of the formula

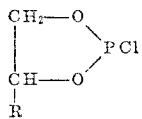

wherein R has the same meaning as defined above with an aldehyde of the formula

wherein $R_1$ has the same meaning as defined above in the presence of an organic phosphite which is reactive in the Arbusow reaction and which has the formula

wherein R', R" and R''' have the same meaning as defined above, the above reaction being effected in two stages consisting of heating the reaction mixture at a temperature of 15 to 160° C. to effect polymer formation and then heating the reaction mixture at a temperature of 160 to 250° C. to effect polymer stabilization.

8. A process as claimed in claim 7, wherein during the final stage of the reaction organic phosphite is added to the reaction mixture in an amount of 2 to 10% by weight based on the total amount of reactants.

9. A process as claimed in claim 7, wherein the reaction is conducted under reflux of an inert solvent selected from the group consisting of an aromatic compound and a chlorinated aliphatic compound.

10. A process as claimed in claim 7, wherein the aldehyde is employed in an amount of 0.8 to 1.2 moles per mole of cyclic chlorophosphite.

References Cited
UNITED STATES PATENTS 3,029,271    4/1962    Birum et al.   ———————— 260—927

JOSEPH REBOLD, Primary Examiner

R. L. RAYMOND, Assistant Examiner

U.S. Cl. X.R.

106—15 FP, 177; 260—45.7 P, 67 R, 968, 969, DIG. 24